United States Patent [19]

Quataert

[11] Patent Number: 5,079,906
[45] Date of Patent: Jan. 14, 1992

[54] MOWING MACHINE

[75] Inventor: Petrus M. Quataert, Nuenen, Netherlands

[73] Assignee: P.J. Zweegers en Zonen Landbouwmachinefabriek, Geldrop, Netherlands

[21] Appl. No.: 533,389

[22] Filed: Jun. 5, 1990

[30] Foreign Application Priority Data

Jun. 22, 1989 [NL] Netherlands ............... 8901566

[51] Int. Cl.$^5$ .................................... A01D 34/66
[52] U.S. Cl. .................................... 56/6; 56/13.6
[58] Field of Search ............... 56/6, 7, 14.9, 12.7, 56/11.6, 13.6

[56] References Cited

U.S. PATENT DOCUMENTS 4,709,540 12/1987 Collart ............................ 56/6 X
4,947,629 8/1990 Ermacora et al. ............... 56/13.6

FOREIGN PATENT DOCUMENTS 0206965 12/1986 European Pat. Off. .
0300207 1/1989 European Pat. Off. .
2110911 6/1972 France .
2548862 1/1985 France .
8501817 1/1987 Netherlands .
8601559 1/1988 Netherlands .

Primary Examiner—William P. Neuder
Attorney, Agent, or Firm—Oblon, Spivak, McClelland, Maier & Neustadt

[57] ABSTRACT

The invention relates to a mowing machine provided with a hollow frame beam and with a plurality of mowing devices supported by the frame beam. The mowing devices are rotatable about axes of rotation extending upwardly and parallel to each other and can be driven by way of a driving belt provided in the frame beam and pulleys, located in the frame beam, which are coupled to the mowing devices. The axes of rotation of the mowing devices slope upwards during operation, when seen in the intended direction of movement, relative to a vertical plane extending in the direction of movement. Stubs are secured to the bottom plate of the frame beam, on each of which stubs there is journalled, by way of bearings a driving mechanism secured to a mowing device.

9 Claims, 3 Drawing Sheets

MOWING MACHINE

BACKGROUND OF THE INVENTION

The invention relates to a mowing machine provided with a hollow frame beam and with a plurality of mowing means supported by said frame beam, which mowing means are rotatable about axes of rotation extending upwardly and parallel to each other and which can be driven by means of a driving belt provided in said frame beam and pulleys, located in said frame beam, which are coupled to said mowing means.

A mowing machine equipped with a belt transmission for driving the mowing means has several advantages compared with a mowing machine wherein the mowing means are driven by means of a gear transmission located in the frame beam. Thus the driving mechanism is considerably lighter and less expensive and at the same time more silent when a belt transmission is used, and also it is possible for a mowing means to slip with respect to the belt when said mowing means strikes an obstacle, without the other mowing means having to be slowed down. With a gear transmission, however, the whole driving mechanism and all mowing means must be slowed down when one of the mowing means strikes an obstacle, which may lead to heavy loads and even breaking down of the transmission means or the like.

A disadvantage of the mowing machine wherein a belt transmission is used for driving the mowing means is, however, that the adjacent, partially overlapping mowing means must be arranged at different heights in order to prevent that the cutting knives of the mowing means touch each other in case of slip in the belt transmission possibly occurring at the location of one of the mowing means. In practice this may lead to an irregular mowing pattern, since the crop in adjacent strips covered by different mowing means may have different heights after mowing.

According to the invention the axes of rotation of the mowing means slope upwards during operation, when seen in the intended direction of movement, relative to a vertical plane extending in the direction of movement.

It has become apparent that as a result of said sloping arrangement of the axes of rotation said irregular mowing pattern can be pushed back to a considerable degree, and an even cutting of the crop to the desired distance from the ground can be obtained.

A further aspect of the invention relates to a mowing machine provided with a hollow frame beam and with a plurality of mowing means supported by said frame beam, which mowing means are rotatable about upwardly extending axes of rotation and which can be driven by means of a driving mechanism located in said frame beam, said driving mechanism being provided with driving means connected with said mowing means.

According to the invention stubs are secured to the bottom plate of the frame beam, on each of which stubs there is journalled, by means of bearings, a driving mechanism secured to a mowing means.

In this manner a simple and inexpensive support for the mowing means, consisting of only few parts, can be obtained.

A further aspect of the invention relates to a mowing machine provided with a frame having a hollow frame beam and a plurality of mowing means supported by said frame beam, which mowing means are rotatable about upwardly extending axes of rotation and which can be driven by means of a driving mechanism located in said frame beam, while a mowing means arranged near one end of the mowing machine is coupled to an outgoing shaft of a gear box arranged thereabove, one ingoing shaft of said gear box being provided with a pulley, which forms part of a belt transmission to be coupled to the rear of a tractor or the like.

With usual machines of this kind the outgoing shaft of the gear box is usually connected with a stub secured to the mowing means, by means of an intermediate shaft having two cardan joints, since the construction is usually not such that the central axis of the outgoing shaft of the gear box is and stays in line with the axis of rotation of the mowing means in question. This makes such known constructions complicated and costly, however.

SUMMARY OF THE INVENTION

The object of the invention is to obtain a mowing means of the above kind, wherein the drawbacks mentioned can be overcome.

According to the invention the outgoing shaft of the gear box is for that purpose fixed to the mowing means and an arm is secured to the box, which arm is coupled to the frame in two points spaced from each other by some distance, in such a manner that the arm can make a limited tilting movement in two directions with respect to the frame.

The connection between the outgoing shaft of the gear box and the mowing means can be made in a very simple manner, while the tolerance variations in the parts and the force exerted on the gear box by the belt transmission can be taken up in an efficient manner by the means with which the arm connected with the gearbox is connected with the remaining part of the frame.

BRIEF DESCRIPTION OF THE DRAWINGS

The invention will be further explained hereinafter with reference to an embodiment of the construction according to the invention diagrammatically illustrated in the accompanying figures, wherein.

DESCRIPTION OF THE PREFERRED EMBODIMENT

Figure 1:
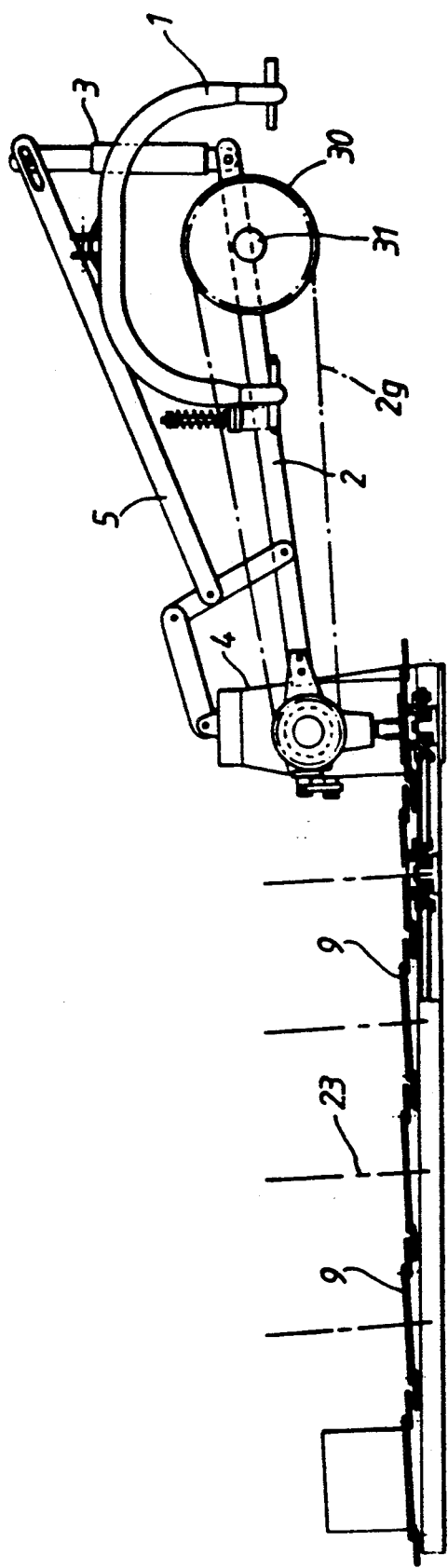
FIG. 1 shows, partly in elevational view and partly in section, a front elevational view of a machine according to the invention.
Figure 2:
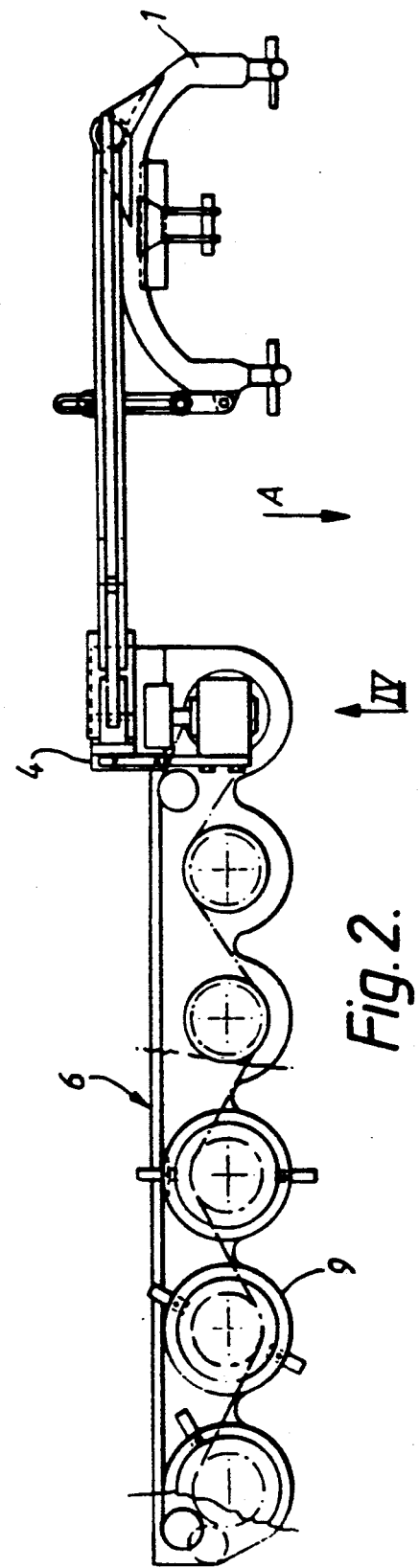
FIG. 2 shows a plan view of FIG. 1.

The mowing machine illustrated in FIGS. 1 and 2 has an attachment block 1 of a usual construction, by means of which the machine can be coupled to e.g. the three-point hitch of a tractor. Near its center a frame beam 2 is pivotable with respect to the headstock 1 about a horizontal pivot pin extending perpendicularly to the longitudinal axis of the frame beam 2, by means of a hinge construction 3 engaging one end of the frame beam 2. The other end of the frame beam 2 is secured to an upwardly extending frame part 4 of the mowing device. Said frame part 4 of the mowing device is furthermore coupled, by means of a rod mechanism 5, to the upper end of the hinge construction 3.

The frame part 4, with the further parts secured thereto to be described in more detail hereafter, can be pivoted rearwards with respect to the headstock 1 for moving the mowing machine from an operating position into a transport position.

To the lower end of the frame part 4 there is secured a hollow frame beam 6, which is provided with a profiled bottom plate 7 and with an upper plate 8. During normal operation said hollow frame beam extends in a usual manner transversely to the intended direction of movement according to arrow A (FIG. 2).

Said frame beam 6 is used to support a plurality of mowing means 9 arranged side by side in a usual manner. As is apparent in particular from FIG. 3 each mowing means is provided with a dish-shaped plate 9', to the outer circumference of which there are coupled cutting knives 11 by means of hinge pins 10. Said cutting knives 11 are usually made of a strip-shaped material, while the parts of the knives projecting beyond the outer circumference of the dish 9' during normal operation are twisted about their longitudinal axis in a usual manner, so that the knives have a certain lifting effect on the cut-off crop.

The dish-shaped means 9' is clamped on the hub 13 of a pulley 14 by means of bolts 12. Said pulley 14 is journalled, by means of bearings 15 accommodated in a bore of said hub 13, on a stub 16. Said stub 16 is at its lower side provided with a flange 16' being integral therewith, which flange 16' is welded on the bottom plate 7·of the frame beam 6. The bearings 15 are secured against displacement relative to the hub 13 by means of a projecting collar 17 provided at the lower side of the hub and being integral therewith, and by means of a spring washer 18 located above the two bearings which is placed in a groove provided in the hub. Furthermore the inner rings of the ball bearings 15 are confined between a shoulder of the stepped lower end of the stub 16 and a retaining ring 19 located on top of the inner ring of the upper bearing 15, said retaining ring 19 being secured to the stub 16 by means of a bolt 20.

Figure 3:
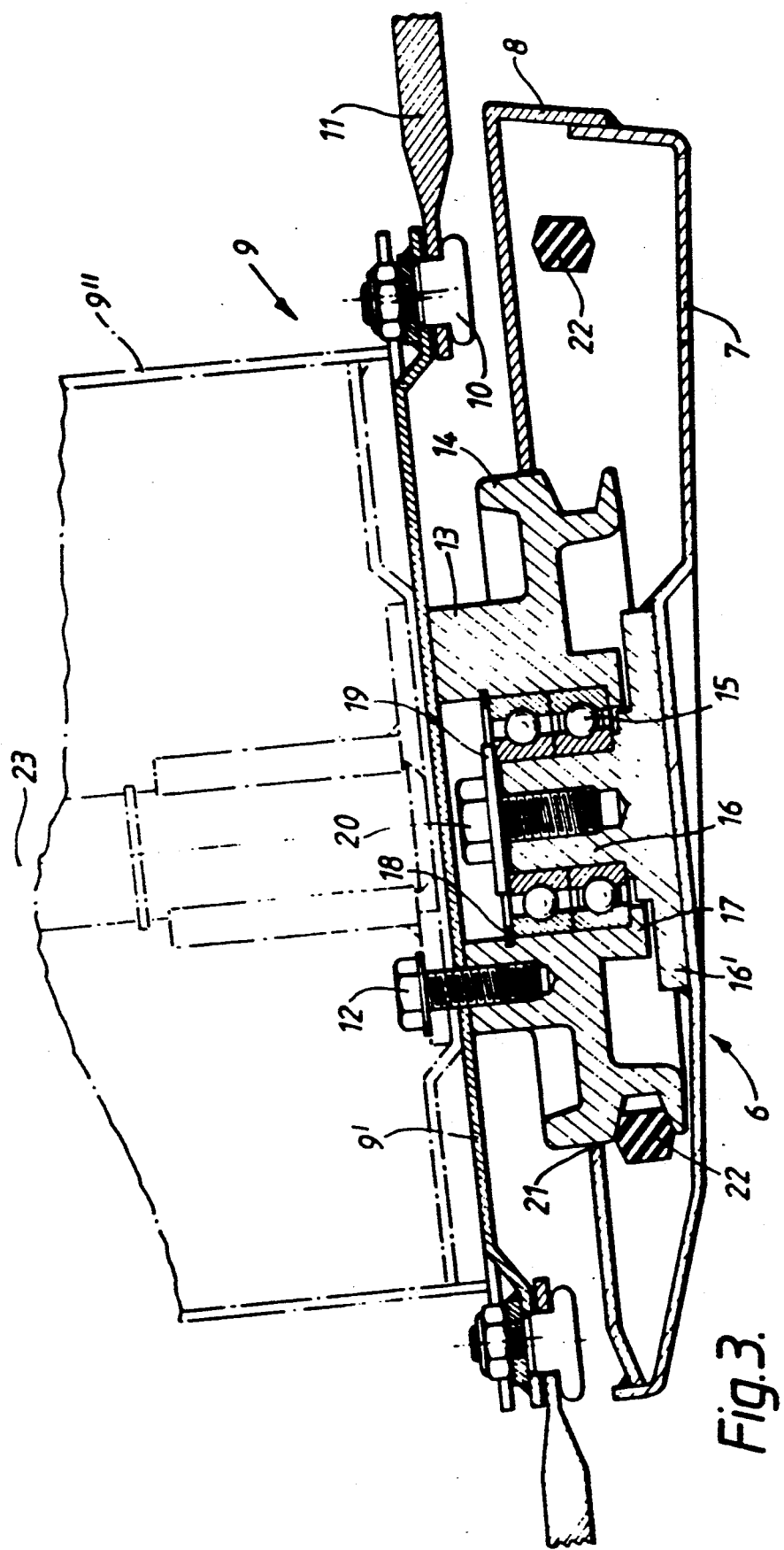
FIG. 3 shows on a larger scale a bottom part of a mowing means, partly in section and partly in elevational view, as well as the frame beam supporting the mowing means located thereunder.

As furthermore appears from FIG. 3 the upper part of the pulley 14 projects beyond the frame beam 6. For this purpose a hole 21 is provided in the upper plate 8, the diameter of said hole 21 being only slightly larger than the external diameter of the upper part of the pulley 14.

As is furthermore diagrammatically indicated in FIG. 2 the pulleys 14 of the mowing means 9 located side by side are coupled together by means of a belt 22, which is passed over the various pulleys in a manner known per se, such that mowing means located side by side can rotate in opposite directions in a usual manner.

As is furthermore diagrammatically indicated by means of dotted lines in FIG. 3 a drum-shaped means 9" may furthermore be secured to one or more of the mowing means.

As is furthermore indicated in FIG. 3 the central axes of the stubs 16, and therewith also the axes of rotation 23 of the mowing means 9, are arranged in such a manner that said axes of rotation slope upward and forward during normal operation, usually at an angle of ±5° with respect to the vertical. With the usual mowing devices the axes of rotation 23 of the mowing means are located in vertical planes which extend perpendicularly to the longitudinal direction of the frame beam 6 supporting the mowing means or, put differently, parallel to the intended direction of movement according to arrow A, so that the parts of the mowing means illustrated in section in FIG. 1 are arranged horizontally.

As is illustrated in FIG. 1, however, the axes of rotation 23 of the mowing means also include an angle with a plane extending vertically and parallel to the direction of movement, whereby all axes of rotation extend obliquely upwards and parallel to each other, when seen in the direction of movement. In general said angle will be between 2° and 4°, and in order to give an idea it may be noted that for example with a center distance between the discs of 39 cm the angle will preferably be 3°. With a larger center distance said angle will become smaller and with a smaller center distance said angle will become larger, in order to achieve that the crop is cut as optimally as possible.

Figure 4:
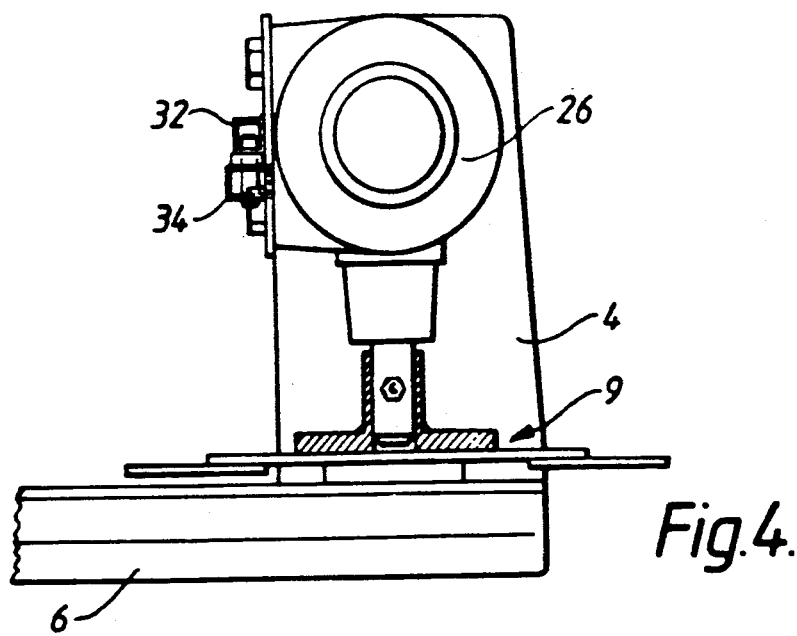
FIG. 4 shows on a larger scale a view of a part of the machine illustrated in FIG. 2, according to the arrow IV in FIG. 2.
Figure 5:
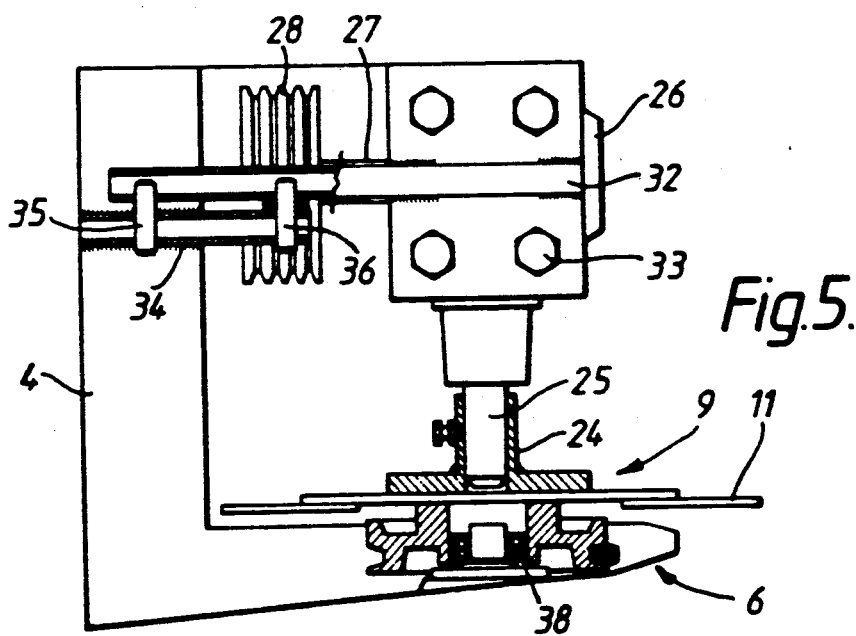
FIG. 5 shows a side elevational view of FIG. 4, partly in section.
Figure 6:
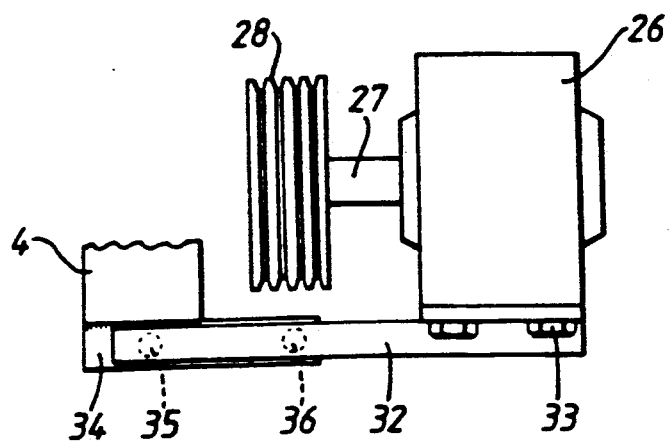
FIG. 6 shows a plan view of FIG. 5.

As is furthermore illustrated in the FIGS. 4–6 the end of a shaft 25 projecting from the gear box is secured to the mowing means located furthest to the right, seen in FIGS. 1 and 2, by means of a bush 24 fixed to the dish 9 of said mowing means. Said outgoing shaft 25 is connected, by means of a right-angled gear transmission located in the gear box 26, with an ingoing shaft 27 of the gear box. Said ingoing shaft 27 carries a pulley 28, which is coupled, by means of one or more belts 29 diagrammatically indicated in FIG. 1, to a pulley 30, which is secured to a shaft 31 supported by the beam 2. Said shaft 31 can for example be coupled in a usual manner to the power take-off shaft of a tractor or the like.

To the gear box 26 located above the mowing means located furthest to the right, seen in FIG. 1, there is furthermore secured a rearwardly extending arm 32 by means of bolts 33. To the frame part 4 there is secured an arm 34 extending parallel to the arm 32 and being located under the arm 32. To the arm 34 there are secured a pair of upwardly extending pins 35 and 36, which are accommodated with some ply in holes provided in the arm 32 for that purpose. As is apparent from FIG. 5 said pin 36 is thereby located near the center of the pulley 28, when seen in a direction perpendicular to the axis of rotation of the ingoing shaft 27 of the gear box 26, while said pin 35 is located near the frame beam 4, at the side of the pin 36 remote from the gear box.

By using this construction the outgoing shaft 25 of the gear box can be connected to the mowing means located furthest to the right, seen in FIGS. 1 and 2. The gear box 26 is thereby supported via the bearings of the mowing means in question located under the gear box. Said mowing means will be journalled in the frame beam 6 by means of a so-called suspension bearing 38, which allows a certain pivoting of the mowing means relative to the frame beam 6. Forces exerted by the belt transmission 28, 29, 30 on the ingoing shaft, and therewith on the gear box 26, are taken up by means of the arm 32 secured to the gear box and by the ends of the pins 35 and 36 inserted into said arm and transmitted to the frame part 4. The arm 32 can thereby make a limited tilting movement in two directions relative to the frame part 4, viz. in the plane of the drawing of FIG. 5 and in the plane of the drawing of FIG. 6, about a pivot point near the pin 36.

I claim:

1. A mowing machine comprising:
   a hollow frame beam;
   a plurality of mowing means supported by said hollow frame beam, said mowing means being rotatable about axes of rotation which extend upwardly and parallel to each other; and driving belt means and pulleys for driving said plurality of mowing means, said driving belt means being provided in said frame beam and said pulleys being located in said frame beam and coupled to said mowing means;

wherein when said mowing machine is stationary, said axes of rotation of said mowing means extend obliquely upward when viewed in an intended direction of movement, relative to a vertical plane extending in the direction of movement.

2. Mowing machine according to claim 1, wherein the axes of rotation include an angle between 2° and 4° with a vertical plane extending in the direction of movement.

3. Mowing machine according to claim 1, wherein the angle between the axis of rotation of a mowing means and a vertical plane extending in the direction of movement is ±3.

4. A mowing machine comprising:
a hollow frame beam having a bottom plate;
a plurality of mowing means supported by said frame beam, said mowing means being rotatable about upwardly extending axes of rotation;
a driving mechanism comprising driving means connected to said mowing means for driving said mowing means, said driving mechanism being located in said frame beam; and
stubs secured to the bottom plate of the frame beam, on each of which stubs there is journalled, by means of bearings, a driving mechanism secured to a mowing means.

5. Mowing machine according to claim 4, wherein said driving means defines a wheel-shape, an upper end of the wheel-shaped driving means projects through a hole provided in an upper plate of the frame beam, the diameter of said hole being slightly larger than the external diameter of the upper part of the driving means.

6. Mowing machine according to claim 1 or 5, wherein said driving means is formed by a pulley provided with a hub, at the upper side of which there is secured a dish-shaped means, to the outer circumference of which there are secured cutting knives.

7. Mowing machine provided with a frame having a hollow frame beam and a plurality of mowing means supported by said frame beam, which mowing means are rotatable about upwardly extending axes of rotation and which can be driven by means of a driving mechanism located in said frame beam, while a mowing means arranged near one end of the mowing machine is coupled to an outgoing shaft of a gear box arranged thereabove, one ingoing shaft of said gear box being provided with a pulley, which forms part of a belt transmission to be coupled to the power take off shaft of a tractor or the like, characterized in that the outgoing shaft of the gear box is fixed to the mowing means and that an arm is secured to the box, which arm is coupled to the frame in two points spaced from each by some distance, in such a manner that the arm can make a limited tilting movement in two directions with respect to the frame.

8. Mowing machine according to claim 7, characterized in that a second arm, extending under and parallel to the arm secured to the gear box, is secured to the frame, said second arm being provided with pins extending perpendicularly to the longitudinal direction and being spaced from each other, the upper ends of which are accommodated with some play in holes which are provided in the arm that is secured to the gear box.

9. Mowing machine according to claim 8, characterized in that one of said pins is located near the centre of the pulley secured to the gear box, when seen in a direction perpendicularly to the central axis of the ingoing shaft of the gear box, whilst the other pin is arranged at the side of the former pin remote from the gear box.

* * * * *